US012728663B2

(12) United States Patent
Sorby et al.

(10) Patent No.: US 12,728,663 B2
(45) Date of Patent: Sep. 8, 2026

(54) INSERTABLE INDEX CARD FOR CARD SHEETS

(71) Applicants: Phillip Sorby, Mesa, AZ (US); Devan Melendez, Mesa, AZ (US)

(72) Inventors: Phillip Sorby, Mesa, AZ (US); Devan Melendez, Mesa, AZ (US)

( * ) Notice: Subject to any disclaimer, the term of this patent is extended or adjusted under 35 U.S.C. 154(b) by 90 days.

(21) Appl. No.: 18/983,458

(22) Filed: Dec. 17, 2024

(65) Prior Publication Data

US 2026/0166911 A1 Jun. 18, 2026

(51) Int. Cl.
*B42F 21/06* (2006.01)

(52) U.S. Cl.
CPC .................................... *B42F 21/06* (2013.01)

(58) Field of Classification Search
CPC ....................................................... B42F 21/06
See application file for complete search history.

(56) References Cited

U.S. PATENT DOCUMENTS 1,310,468 A * 7/1919 Best ........................ B42F 17/18 116/234
3,363,558 A * 1/1968 Johnson ................. G06K 19/02 101/473
4,813,902 A * 3/1989 Messer .................. B42D 15/02 40/539
4,849,056 A * 7/1989 Ristuccia, Sr. ......... B42F 19/04 281/38
4,930,928 A * 6/1990 Ristuccia, Sr. ......... B42F 19/04 283/56
5,924,227 A * 7/1999 Sommers ................ B42F 17/02 40/379
7,146,758 B1 * 12/2006 Gaston ...................... G09F 7/10 40/907
2004/0056473 A1 * 3/2004 Hardison ................ B42D 3/12 281/9
2004/0099541 A1 * 5/2004 Sturba .................... B42D 15/02 206/39
2005/0207828 A1 * 9/2005 Walker ...................... B42F 5/00 402/79
2009/0290930 A1 * 11/2009 Rodriguez, Jr. ........ B42F 7/025 402/79
2011/0089060 A1 * 4/2011 Peyser ............... A47G 25/1407 206/278
2014/0224691 A1 * 8/2014 Sadler ..................... B42F 21/06 229/67.4
2019/0315146 A1 * 10/2019 Leung ....................... B43L 9/00

* cited by examiner

*Primary Examiner* — Gary C Hoge
(74) *Attorney, Agent, or Firm* — Accelerate IP LLC

(57) ABSTRACT

The invention pertains to an insertable index device designed for insertion into a card sheet protector with a pocket. The device comprises a main body with a top surface, a bottom surface, and a thickness between the two surfaces. The main body is defined by a long side adjacent to a short side and includes at least one first slot parallel to the short side and a second slot parallel to the long side, forming a pocket insert configured to occupy a majority of the pocket. A tab extends from the long side of the main body. The tab can be positioned at varying locations along the long side, allowing for stacking of the devices while keeping all tabs visible.

15 Claims, 7 Drawing Sheets

INSERTABLE INDEX CARD FOR CARD SHEETS

FIELD OF THE INVENTION

The field of the disclosed technology pertains to storage and organization solutions for collectible cards and similar items, and even more specifically on insertable index card specifically structured for integration within card sheet protectors.

BACKGROUND OF THE INVENTION

Collectible cards are a huge industry and keeping the cards in mint condition while being able to organization them requires sheet protectors which can protect and store the cards. These sheet protectors, provide a clear, protective layer over the cards. Collectible card organization and storage utilizes a myriad of protective and display systems designed to preserve the quality and enhance the management of collectible items. Commonly, collectible cards are stored in sheet protectors, which offer a basic level of protection against damage and environmental factors. These protectors typically operate by enclosing the cards in pockets within a binder, allowing for viewing and basic organization. Despite their widespread use, conventional sheet protectors exhibit limitations in offering customized organizational structures.

Existing technologies in this space struggle to address several shortcomings inherent in the conventional use of sheet protectors. Problems such as inadequate stabilization within the protector lead to the misalignment of cards, especially during the manipulation of pages, which is a frequent occurrence in collections that are referred to regularly. Additionally, the lack of a system to incorporate detailed labeling or accessibility features, like numbering, Braille or multilingual options, restricts the personalization and utility of storage solution systems. Organizing or indexing these card sheets often involve writing directly on the sheets or using adhesive labels, both of which can be permanent and not easy to use. Existing card sheet protectors usually have pockets with openings on one side, making it difficult to insert and remove the sheets without causing damage. Furthermore, the lack of a proper indexing system can make it challenging to quickly locate a specific sheet, especially when dealing with a large number of sheets. Additionally, the durability of these index devices is often compromised due to repeated use, leading to tearing or deformation. This is particularly problematic when the index devices are made of less durable materials. Such limitations affect both private collectors and those who wish to display their collections publicly or quickly access certain cards, where organization and accessibility are of increased importance.

What is needed is an improved system that enhances the organization and security of collectible cards within sheet protectors. Such a solution would provide a sturdier mechanism for retaining cards in place, thereby minimizing the risk of dislodgement or misalignment caused by routine handling. Moreover, the system should offer customization capabilities to cater to diverse collecting needs, improving information presentation and accessibility. A simplified, integrated approach that combines structural integrity with optional features, without reliance on adhesives or extraneous components, would significantly advance current methodologies in the organization and display of collectible cards.

SUMMARY OF THE INVENTION

The present invention is a innovative insertable index device designed for insertion into a card sheet protector with a pocket. The index device can comprise a main body with a top surface, a bottom surface, and a thickness between these surfaces. The main body can be characterized by a long side adjacent to a short side. The main body can also include at least one first slot parallel to the short side and a second slot parallel to the long side, which together can define a pocket insert designed to occupy a majority of the pocket. A tab can extend from the long side of the main body.

The pocket of the card sheet protector can have an opening parallel to either the short side or the long side. The pocket insert can be removably placed into the opening on either side of the pocket. The first slot and the second slot can further define a first outer edge and a second outer edge which do not occupy the pocket. The thickness between the top surface and the bottom surface of the main body can be less than 5 mm.

The tab extending from the main body can have a recess on at least one of the top or bottom surfaces. This recess can have identifying information printed, embossed, or affixed onto it. The tab can also have a textured or ribbed surface on at least one of its sides to enhance gripping and minimize slipping. The first slot and the second slot can be reinforced with a rigid border to prevent tearing or deformation during repeated use. The tab and main body can include a perforation or hinge to allow selective removal and/or adjustment of the tab.

The card sheet protector can comprise an outer seam, and at least one first slot can substantially extend past the second slot to accommodate this outer seam. The main body of the index device can be made of a material selected from the group consisting of Acrylonitrile Butadiene Styrene (ABS), polycarbonate (PC), or nylon. The tab can be positioned at varying locations along the long side, enabling the device to be stacked such that all tabs remain visible to the user.

The invention can also include a method of manufacturing the insertable index device. This method can involve forming a main body with a top surface, a bottom surface, and a thickness between these surfaces. A long side adjacent to a short side of the main body can be defined, and at least one first slot parallel to the short side and a second slot parallel to the long side can be created, thereby defining a pocket insert configured to occupy a majority of the pocket. A tab extending from the long side can also be formed.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the “special” definition of that term and explain how it differs from the plain and ordinary meaning. Absent such clear statements of intent to apply a “special” definition, it is the inventors’ intent and desire that the simple, plain and ordinary meaning to the terms be applied to the interpretation of the specification and claims. Aspects and applications of the invention presented here are described below in the drawings and detailed description of the invention.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of . . . "), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth to provide a thorough understanding of the various aspects of the invention. It will be understood, however, by those skilled in the relevant arts, that the present invention may be practiced without these specific details. In other instances, known structures and devices are shown or discussed more generally to avoid obscuring the invention. In many cases, a description of the operation is sufficient to enable one to implement the various forms of the invention, particularly when the operation is to be implemented in software. It should be noted that there are many different and alternative configurations, devices, and technologies to which the disclosed inventions may be applied. The full scope of the inventions is not limited to the examples that are described below.

Figure 1:
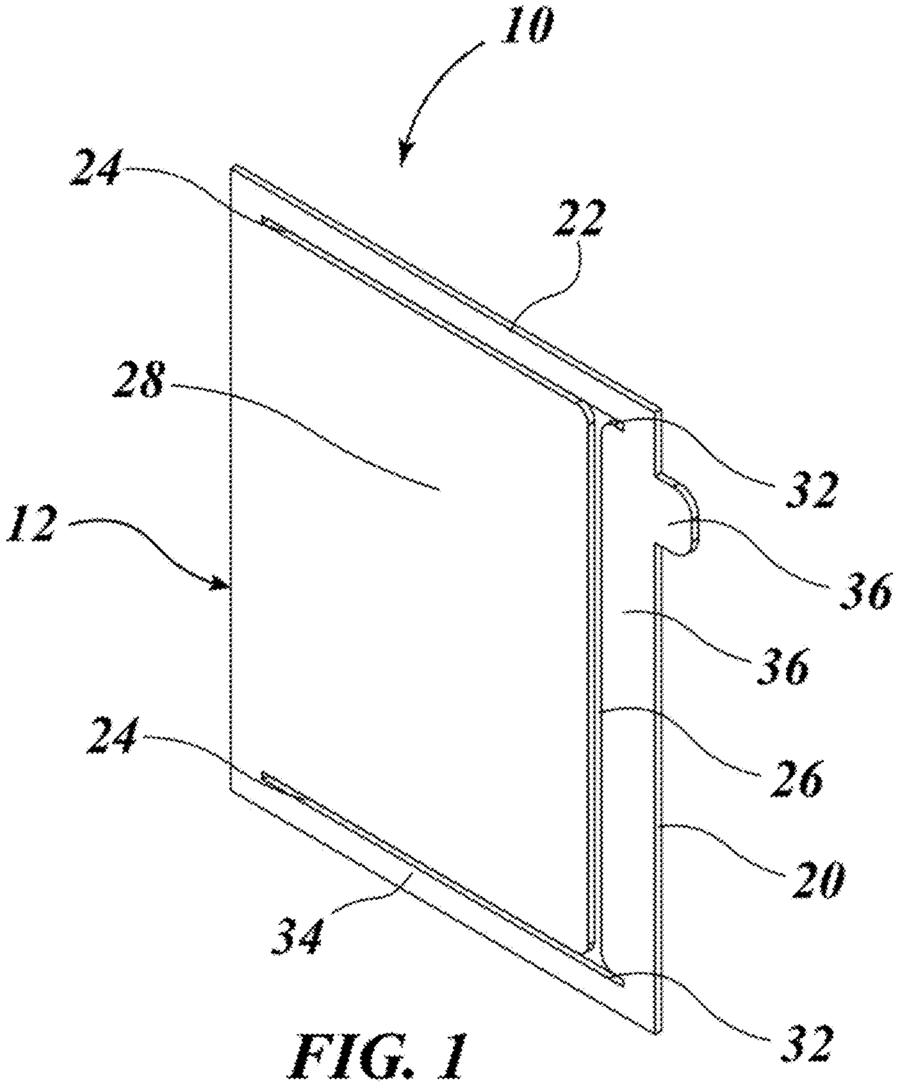
FIG. 1 shows an isometric view of the insertable index card for card sheets in accordance to one or more embodiments.
Figure 2:
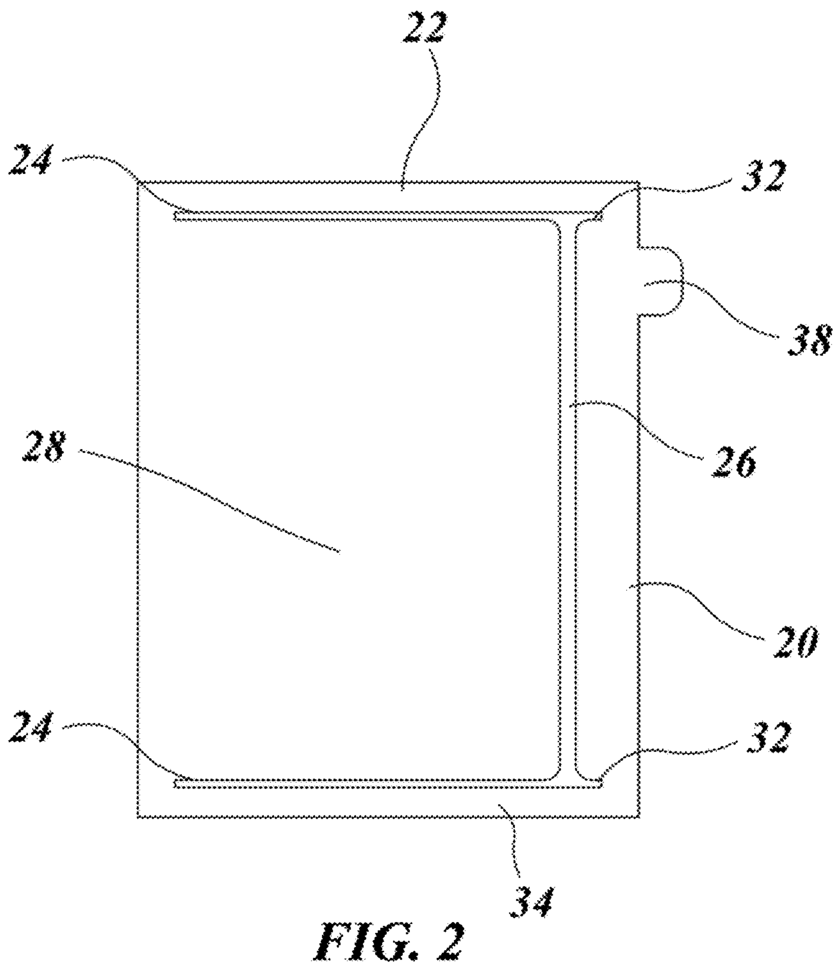
FIG. 2 shows a front view of the insertable index card for horizontal card sheets in accordance to one or more embodiments.
Figure 3:
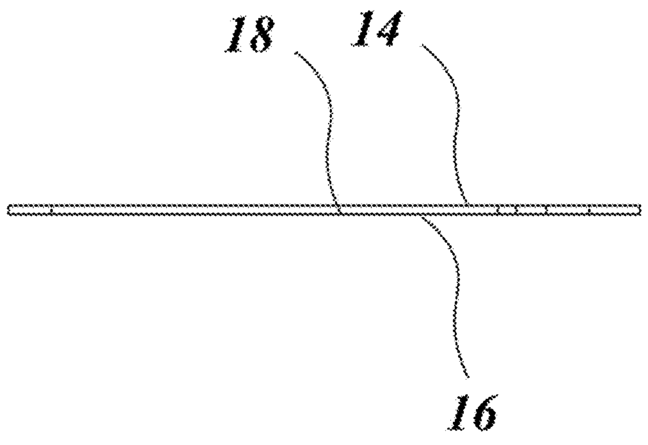
FIG. 3 shows a top view of the insertable index card for card sheets in accordance to one or more embodiments.
Figure 7:
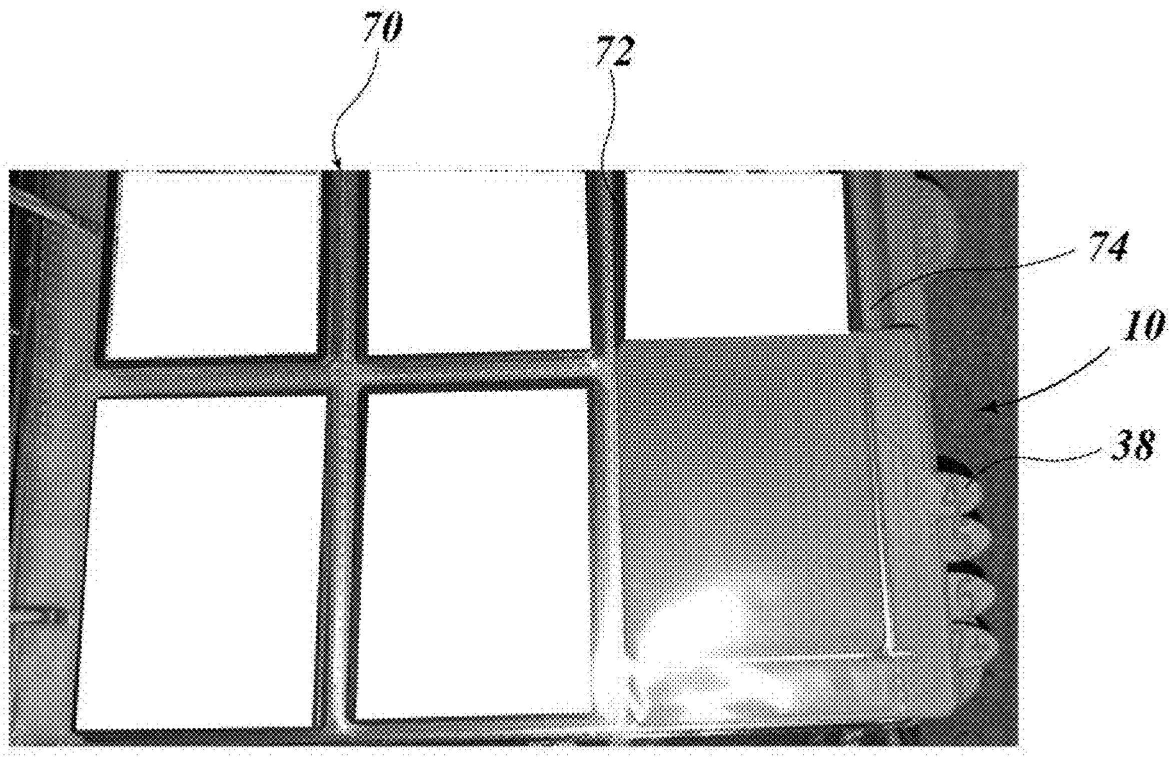
FIG. 7 shows a front view of an example embodiment of insertable index card for card sheets in accordance to one or more embodiments.
Figure 8:
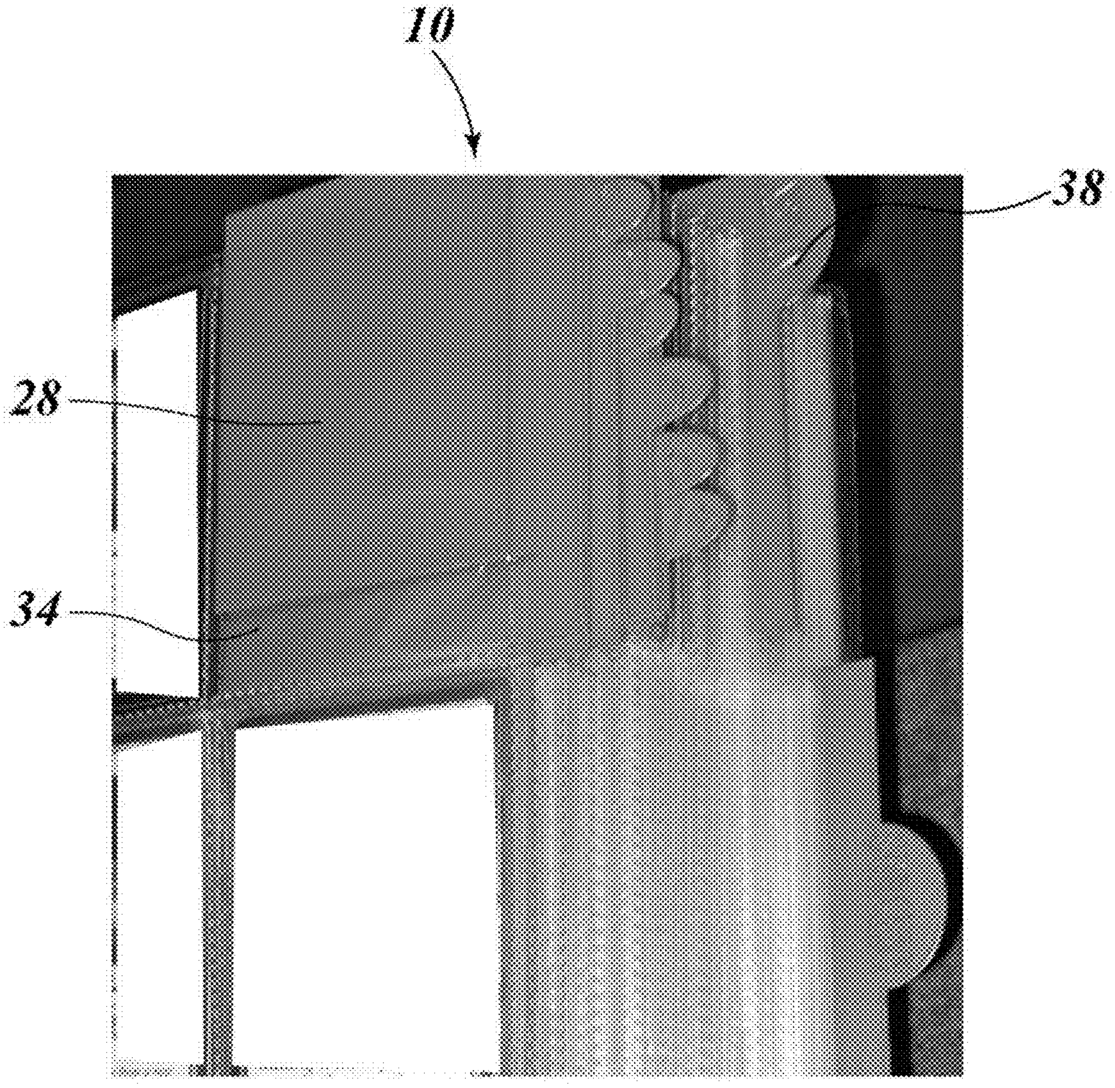
FIG. 8 shows a front view of another example embodiment of insertable card for card sheets in accordance to one or more embodiments.

Referring initially to FIGS. 1-3, an insertable index card device, is shown generally at 10, for card sheets 70 wherein the card sheets can have a plurality of pockets 72 for cards and an outer seam 74, as shown in FIGS. 7-8. The device can comprise a main body 12 which can comprise a top surface 14 and a bottom surface 16, and a thickness 18 between the top surface and the bottom surface. The main body 12 can have a long side 20 adjacent to a short side 22 which can form a rectangular shape however in other embodiments the main body can be any suitable shape or size to fit various types of card sheets. The plurality of pockets 72 can have an opening parallel to the short side 22 or an opening parallel to the long side 20. The thickness 18 of the main body 12 can have a thickness 18 of such as, for example, 1 mm to 10 mm and even more preferably 2 mm to 8 mm and even still more preferably 5 mm. The main body 12 can be constructed from materials such as, for example, plastic, Acrylonitrile Butadiene Styrene (ABS), polycarbonate (PC), nylon, stainless steel, aluminum, ceramic or the like.

Figure 4:
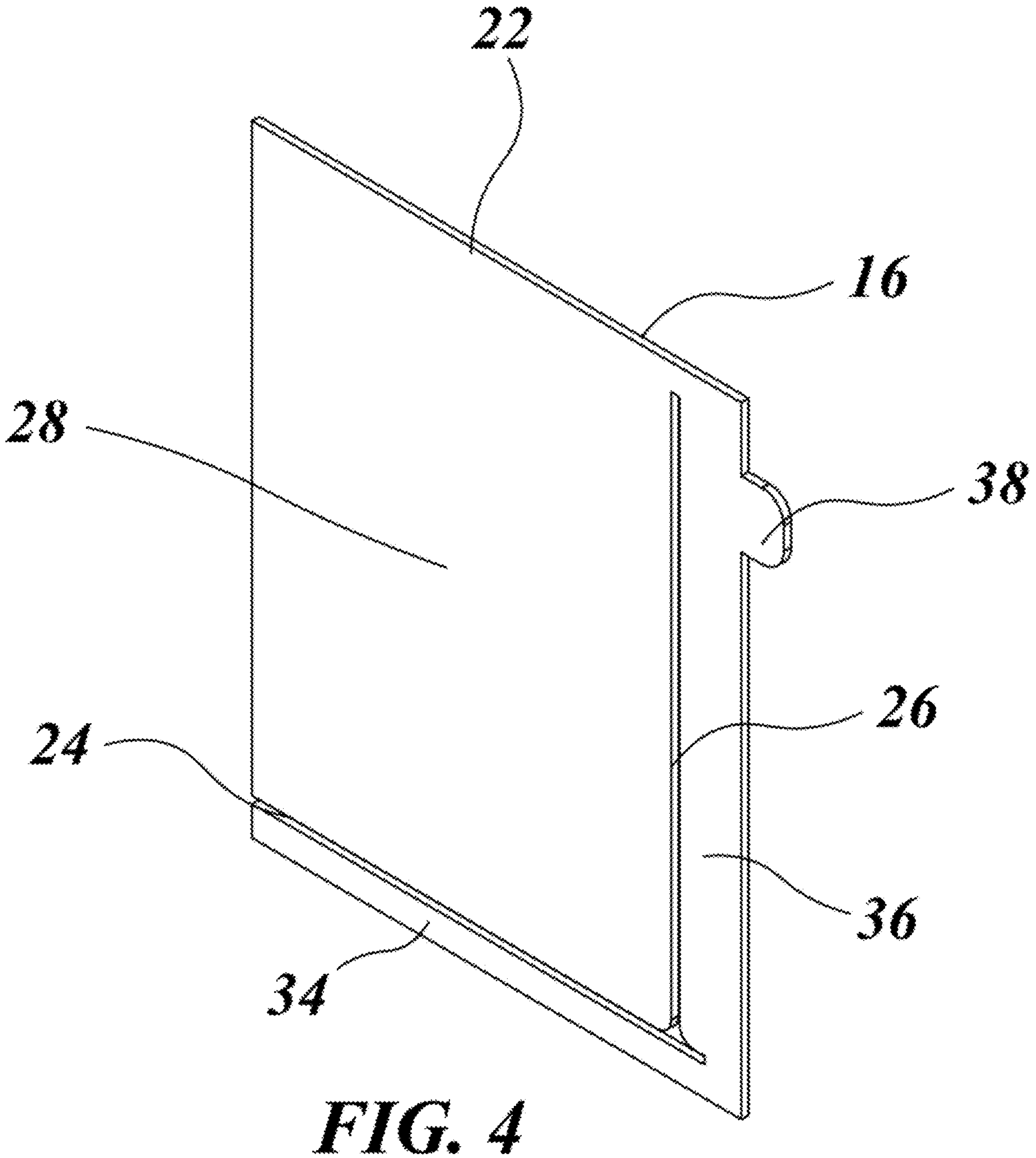
FIG. 4 shows an isometric view of the insertable index card for vertical card sheets in accordance to one or more embodiments.
Figure 5:
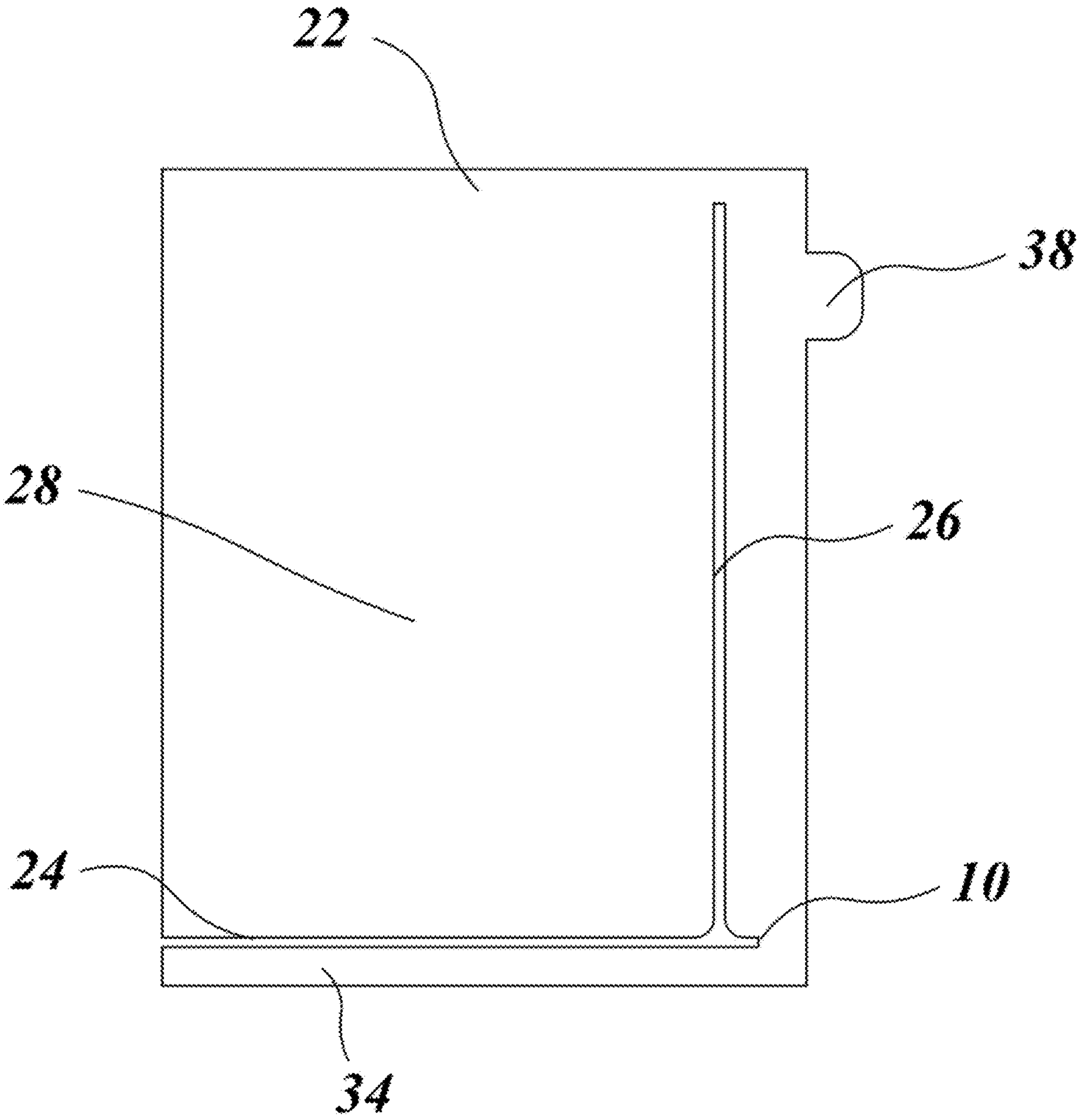
FIG. 5 shows a front view of the insertable index card for vertical card sheets in accordance to one or more embodiments.
Figure 6:
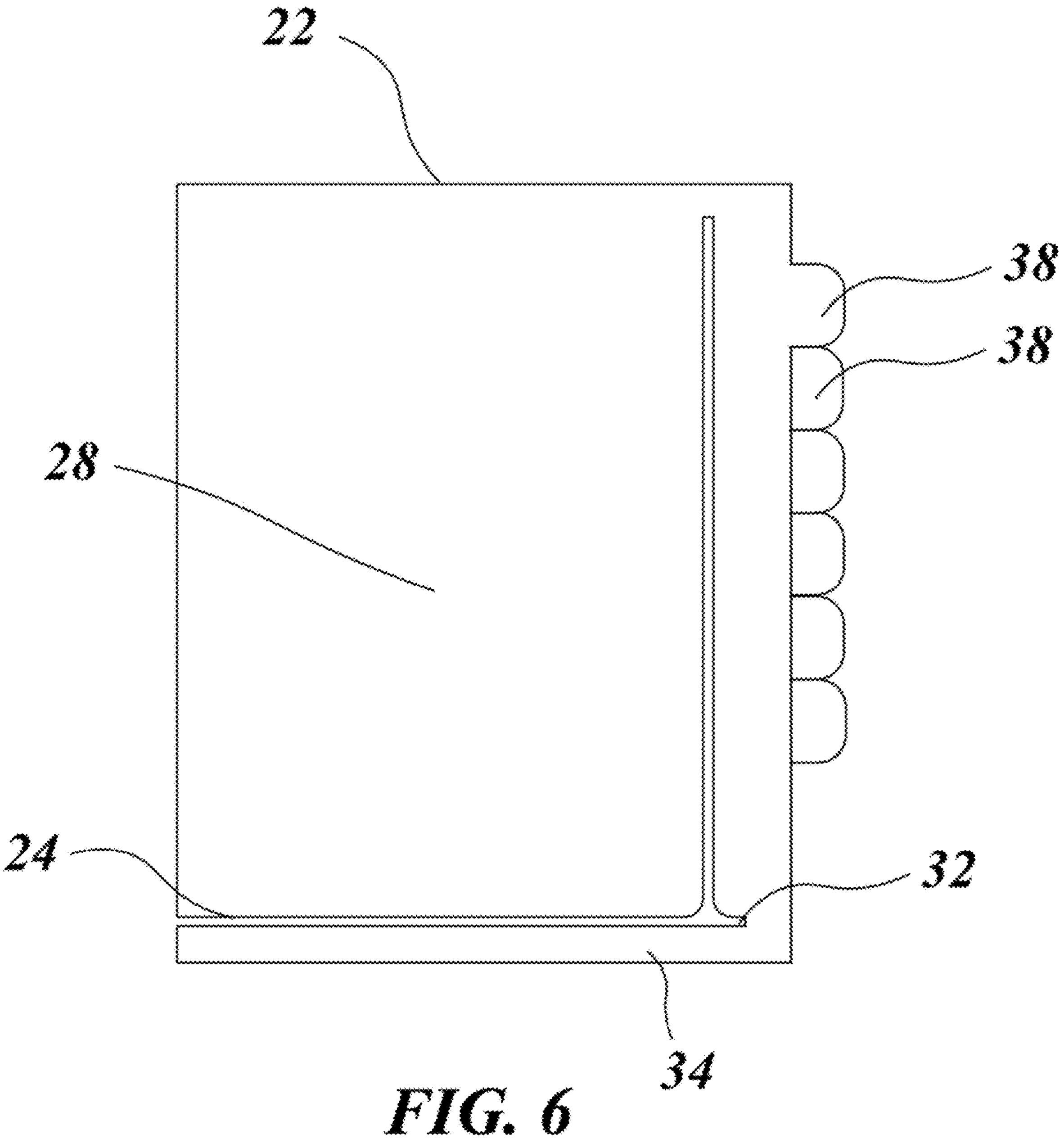
FIG. 6 shows a front view of multiple insertable index card stacked for vertical card sheets in accordance to one or more embodiments.

The main body 12 can have at least one first slot 24 that can be parallel to the short side 22 and a second slot 26 that can be parallel to the long side 20 that can define a pocket insert 28 that can be configured to occupy a majority of the pocket 70. The at least one first slot 24 can be located at the top of the main body 12 and/or the bottom of the main body which can accommodate a pocket that has an opening from the top or an opening from the side. The at least one first slot 24 can extend from one side of the main body 12 to substantially close to the other side past the second slot 26 as shown in FIGS. 4-5 or the at least one first slot can be substantially close to both sides of the main body as shown in FIG. 1. To accommodate the opening parallel to the short side the at least one first slot 24 can be one first slot substantially near the bottom of the main bottom 12 and open on side. To accommodate an opening parallel to the long side 20 there can be two first slots 24 substantially near the top and bottom of the main bottom 12 and closed on both sides. In certain embodiments, the at least one first slot 24 and the second slot 26 can be spaced on the main body 12 to accommodate different sized pockets 72 for different size cards. The at least one first slot 24 and the second slot 26 can be reinforced with a rigid border to prevent tearing or deformation during repeated use.

In embodiments, the pocket insert 28 is configured to be inserted into the pocket 70, where it may either substantially occupy the majority of the pocket or partially fill it. The pocket insert 28 may have a uniform thickness or include chamfered edges to facilitate easy insertion into the pocket. The pocket insert 28 can be designed to be removably placed through the opening located on either the long side 20 or the short side 22. The at least one first slot 24 and the second slot 26 further define a first outer edge 34 and a second outer edge 36, which remain outside the pocket 72. These outer edges are designed to support the pocket insert and apply compression to the pocket 72, ensuring the device remains securely in place and does not shift within the pocket. The first outer edge 34 and the second outer edge 36 are adjustable in size to fit pockets 72 of varying dimensions. In certain embodiments, the second outer edge 36 can extend beyond the outer seam 74 allowing the user to easily grab the device and turn the card sheet 70.

In embodiments, a tab 28 can extend from the long side 20 or the short side 22. The tab 28 can be either integral to the main body 12 or can be removably attached by such as, for example, a perforation, a hinge, slot and groove, interlocking tabs, clip-on tabs, snap-in tabs or the like that can allow the user to selectively remove and/or adjust the tab so suit the user's specific needs. The tab 28 can vary in size such as length and width allowing the user to customize the tab. The tab 28 can have a textured or ribbed surface on at least one its sides to enhance gripping and minimize slipping and in other embodiments the tab can be smooth. The tab 28 can have a recess on at least one of the top or bottom surfaces wherein the recess can have identifying information printed, embossed or affixed onto it or in other embodiments the tab can be flat or embossed with the identifying information. The tab 28 can be positioned at varying locations along the long side 36 and/or short side 34 enabling the device to be stacked such that all tabs remain visible to the user, as shown in FIG. 7-8.

The method of manufacturing the insertable index device is shown. The method includes forming the main body 10 with a top surface 14, a bottom surface 16, and a thickness 18 between the top and bottom surfaces. A long side 20 adjacent to a short side 22 of the main body 10 is defined. At least one first slot 24 parallel to the short side and a second slot 26 parallel to the long side are created, thereby defining a pocket insert 28 configured to occupy a majority of the pocket 72. A tab 38 extending from the long side 20 is formed. The main body 10 is fabricated with a material selected from the group consisting of Acrylonitrile Butadiene Styrene (ABS), polycarbonate (PC), or nylon.

The insertable index device 10 can be designed to be inserted into a card sheet protector having a pocket 72. The pocket 72 has an opening parallel to the short side 22 or an opening parallel to the long side 20. The pocket insert 28 can be removably placed into the opening on the long side or short side of the pocket. The card sheet protector 70 comprises an outer seam 74. The first slot 11 substantially extends past the second slot 12 to accommodate the outer seam. The insertable index device is not limited in size to conventional card sheet protectors. It can be designed to fit large or small card sheet protectors or other items such as documents and the like. Other changes falling within the scope and spirit of this invention will occur to those skilled in the art. The insertable index device is therefore not to be thought of as limited to the one example set forth for illustrative purposes.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

We claim:

1. An insertable index device for inserting into a card sheet protector having a pocket, comprising:

a main body comprising:

- a top surface and a bottom surface, and a thickness between the top surface and the bottom surface;
- a long side adjacent to a short side;
- at least one first slot that is parallel to the short side and a second slot that is parallel to the long side defining a pocket insert configured to occupy a majority of the pocket; and a tab extending from the long side.

2. The device of claim 1, wherein the pocket has an opening parallel to the short side or an opening parallel to the long side.

3. The device of claim 2, wherein the pocket insert is removably placed into the opening on the long side or short side of the pocket.

4. The device of claim 1, wherein the at least one first slot and the second slot further define a first outer edge and a second outer edge which does not occupy the pocket.

5. The device of claim 1, wherein the thickness between the top surface and the bottom surface is less than 5 mm.

6. The device of claim 1, wherein tab has a recess on at least one of the top or bottom surfaces wherein the recess has identifying information printed, embossed or affixed onto it.

7. The device of claim 6, wherein the tab has a textured or ribbed surface on at least one its sides to enhance gripping and minimize slipping.

8. The device of claim 1, wherein the wherein the first slot and the second slot are reinforced with a rigid border to prevent tearing or deformation during repeated use.

9. The device of claim 1, wherein the tab and main body includes a perforation or hinge to allow selective removal and/or adjustment of the tab.

10. The device of claim 1, wherein card sheet protector comprises an outer seam.

11. The device of claim 10, wherein at least one first slot substantially extends past the second slot to accommodate the outer seam.

12. The device of claim 1, wherein the main body is made of a material selected from the group consisting of Acrylonitrile Butadiene Styrene (ABS), polycarbonate (PC), or nylon.

13. The device of claim 1, wherein the tab is positioned at varying locations along the long side, enabling the device to be stacked such that all tabs remain visible to the user.

14. A method of manufacturing an insertable index device for inserting into a card sheet protector having a pocket, the method comprising:

forming a main body with a top surface, a bottom surface, and a thickness between the top and bottom surfaces;

defining a long side adjacent to a short side of the main body;

creating at least one first slot parallel to the short side and a second slot parallel to the long side, thereby defining a pocket insert configured to occupy a majority of the pocket; and forming a tab extending from the long side.

15. The method of claim 14, further comprising fabricating the main body with a material selected from the group consisting of Acrylonitrile Butadiene Styrene (ABS), polycarbonate (PC), or nylon.

* * * * *